(12) United States Patent
Kuo et al.

(10) Patent No.: US 12,082,330 B2
(45) Date of Patent: Sep. 3, 2024

(54) ELECTRONIC DEVICE CAPABLE OF DISCHARGING STATIC ELECTRICITY

(71) Applicant: PEGATRON CORPORATION, Taipei (TW)

(72) Inventors: Yu-Ti Kuo, Taipei (TW); Chien-Yi Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 204 days.

(21) Appl. No.: 17/841,176

(22) Filed: Jun. 15, 2022

(65) Prior Publication Data

US 2023/0051635 A1 Feb. 16, 2023

(30) Foreign Application Priority Data

Aug. 13, 2021 (TW) .................................. 110129955

(51) Int. Cl.
*H05F 3/04* (2006.01)
*G06F 1/16* (2006.01)

(52) U.S. Cl.
CPC ............. *H05F 3/04* (2013.01); *G06F 1/1656* (2013.01)

(58) Field of Classification Search
CPC ........ H05F 3/04; G06F 1/1656; G06F 1/1616; H01T 19/04
USPC ................................................. 361/231, 132
See application file for complete search history.

(56) References Cited

U.S. PATENT DOCUMENTS

| 8,059,426 | B2 | 11/2011 | Chen |
| 8,553,398 | B2* | 10/2013 | Tatsukami ............ G06F 1/1616 361/810 |
| 8,665,601 | B1* | 3/2014 | Mangay-Ayam, Jr. ..................... H05K 9/0066 361/728 |
| 11,785,733 | B2* | 10/2023 | Cha ........................ G06F 1/1601 361/679.01 |
| 11,916,286 | B2* | 2/2024 | Wei ....................... H01Q 1/2266 |
| 2007/0279829 | A1* | 12/2007 | Gefter ..................... H01T 23/00 361/213 |

(Continued)

FOREIGN PATENT DOCUMENTS

| CN | 101646297 B | 11/2011 |
| CN | 204031426 U | 12/2014 |

(Continued)

*Primary Examiner* — Dharti H Patel
(74) *Attorney, Agent, or Firm* — MUNCY, GEISSLER, OLDS & LOWE, PC

(57) ABSTRACT

An electronic device capable of discharging static electricity is disclosed. The electronic device includes a housing, an antenna arrangement region, and an electrostatic discharge guide. The antenna arrangement region is disposed inside the housing. The electrostatic discharge guide includes a first conductive region, a second conductive region, a non-conductive region, and a discharging unit. The first conductive region is disposed on an inner surface of the housing, and the antenna arrangement region is disposed in the first conductive region. The second conductive region is disposed on the inner surface of the housing. The discharging unit is located in the first conductive region and has a tip, the tip extends toward the second conductive region to cause a spacing between the tip and the second conductive region to be less than or equal to a width of the non-conductive region.

7 Claims, 4 Drawing Sheets

(56) References Cited

U.S. PATENT DOCUMENTS

| | | | | |
|---|---|---|---|---|
| 2009/0316313 A1* | 12/2009 | Ding | ................. | G06F 30/39 |
| | | | | 716/100 |
| 2010/0015371 A1* | 1/2010 | Chen | ................. | H05K 9/0067 |
| | | | | 428/35.9 |
| 2010/0027184 A1* | 2/2010 | Chen | ................. | H05K 9/0067 |
| | | | | 361/220 |
| 2011/0286163 A1* | 11/2011 | Abe | ................. | G06F 1/203 |
| | | | | 361/679.01 |
| 2012/0262826 A1* | 10/2012 | Gillard | ................. | H05K 7/1495 |
| | | | | 29/829 |
| 2013/0093960 A1* | 4/2013 | Kita | ................. | G06F 1/1601 |
| | | | | 361/679.01 |
| 2013/0194514 A1* | 8/2013 | Nakano | ................. | G06F 1/1671 |
| | | | | 361/679.1 |
| 2013/0207853 A1* | 8/2013 | Yamamoto | ................. | H01Q 1/50 |
| | | | | 343/702 |
| 2013/0329460 A1* | 12/2013 | Mathew | ................. | G06F 1/1637 |
| | | | | 362/612 |
| 2014/0128007 A1* | 5/2014 | Chen | ................. | H04B 1/18 |
| | | | | 455/77 |
| 2016/0091932 A1* | 3/2016 | Dighde | ................. | G06F 1/1656 |
| | | | | 156/349 |
| 2022/0285833 A1* | 9/2022 | Wei | ................. | H01Q 9/0421 |
| 2023/0091389 A1* | 3/2023 | Jiao | ................. | G02F 1/133607 |
| | | | | 361/679.01 |

FOREIGN PATENT DOCUMENTS

| | | | |
|---|---|---|---|
| CN | 115117619 A | * | 9/2022 |
| TW | 201006315 | | 2/2010 |

* cited by examiner

ELECTRONIC DEVICE CAPABLE OF DISCHARGING STATIC ELECTRICITY

TECHNICAL FIELD

The disclosure relates to an electronic device, and in particular, to an electronic device capable of effectively discharging static electricity.

BACKGROUND

When a module operating by using a high-speed signal such as USB 3.1 is used in a current electronic device, such as a notebook computer product, a transmission capability of an antenna module is usually affected, resulting in a decrease in a throughput of the antenna module. In the prior art, a conductive material or an absorbing material is usually used to shield a radio frequency interference (RFI) noise source such as the USB 3.1, to prevent noise from interfering with the operation of the antenna module. In a notebook computer product having a housing made of plastic and sputtered coatings, a groove line is cut on the housing to isolate noise sources such as USB3.1, so as to prevent impact on the antenna module. However, the structure in the prior art causes the notebook computer product to goes wrong as a result of a failure of releasing static electricity out when a position near an antenna region is attacked by discharging of static electricity.

SUMMARY

The disclosure is mainly intended to provide an electronic device capable of effectively discharging static electricity.

The electronic device capable of discharging static electricity includes a housing, an antenna arrangement region, and an electrostatic discharge guide. The antenna arrangement region is disposed inside the housing. The electrostatic discharge guide includes a first conductive region, a second conductive region, a non-conductive region, and a discharging unit. The first conductive region is disposed on an inner surface of the housing, and the antenna arrangement region is disposed in the first conductive region. The second conductive region is disposed on the inner surface of the housing. The non-conductive region is configured to isolate the first conductive region from the second conductive region. The discharging unit is located in the first conductive region and has a tip, the tip extends toward the second conductive region to cause a spacing between the tip and the second conductive region to be less than or equal to a width of the non-conductive region, and the tip is not in contact with the second conductive region, thereby discharging static electricity of the first conductive region.

DETAILED DESCRIPTION

In order to allow reviewers to better understand the technical content of the disclosure, specific preferred embodiments are described as follows.

Figure 1:
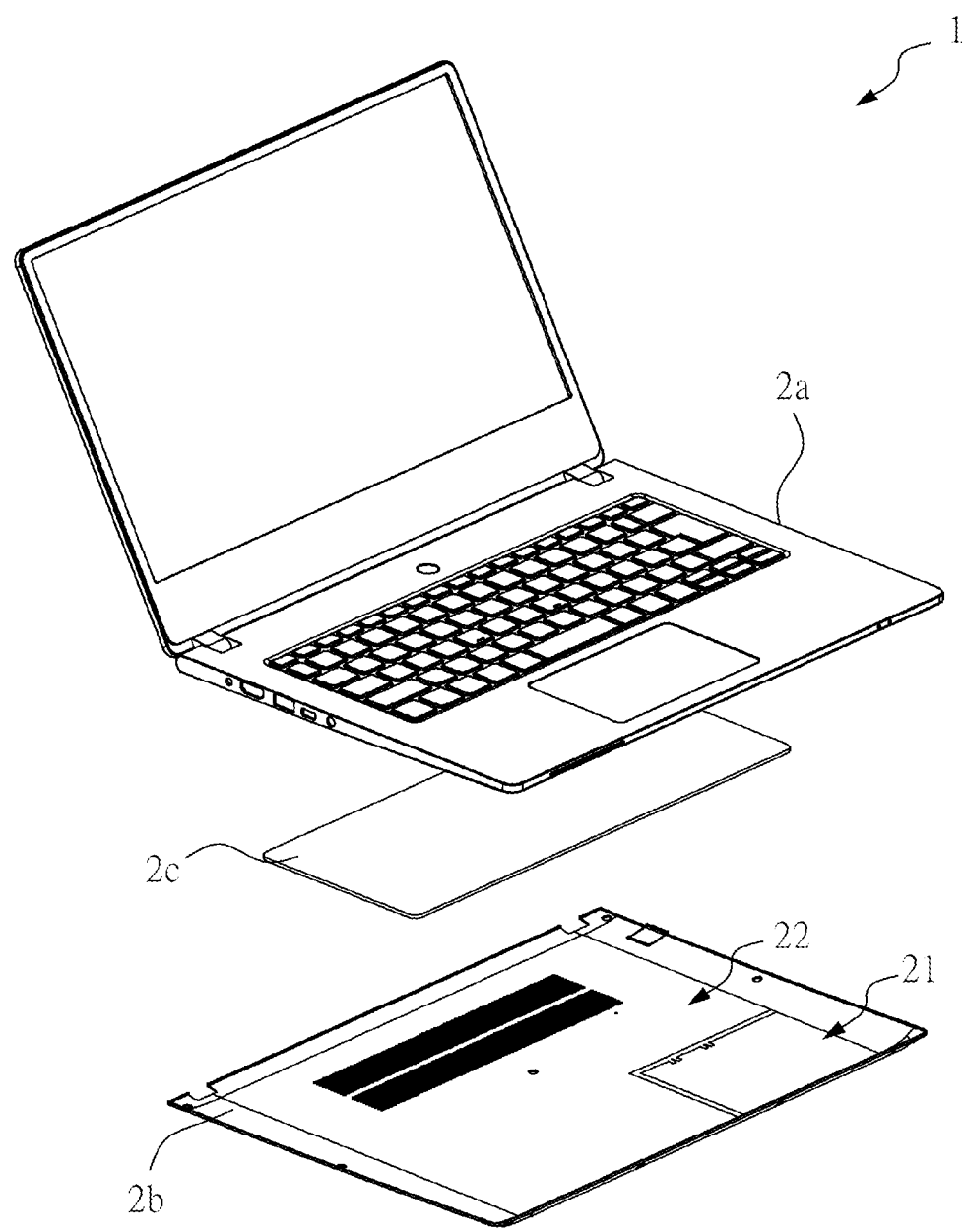
FIG. 1 is a schematic exploded view of an electronic device capable of discharging static electricity according to the present invention.

Referring to FIG. 1 below, FIG. 1 is a schematic exploded view of an electronic device capable of discharging static electricity according to the present invention.

In a first embodiment of the present invention, an electronic device 1 may be a product such as a notebook computer, but the disclosure is not limited to the product. The electronic device 1 is to be used by a user. The electronic device 1 includes an upper housing 2a, a lower housing 2b, and an inner layer 2c between the upper housing 2a and the lower housing 2b. The upper housing 2a and the lower housing 2b both may be made of plastic to reduce a weight of the electronic device 1, but the present invention is not limited thereto. The inner layer 2c is configured to dispose an electronic element. Therefore, the inner layer may be made of a printed circuit board, metal, a plastic, or the like. This may be adjusted according to a requirement such as a purpose or a weight. The disclosure is not limited thereto.

Figure 2:
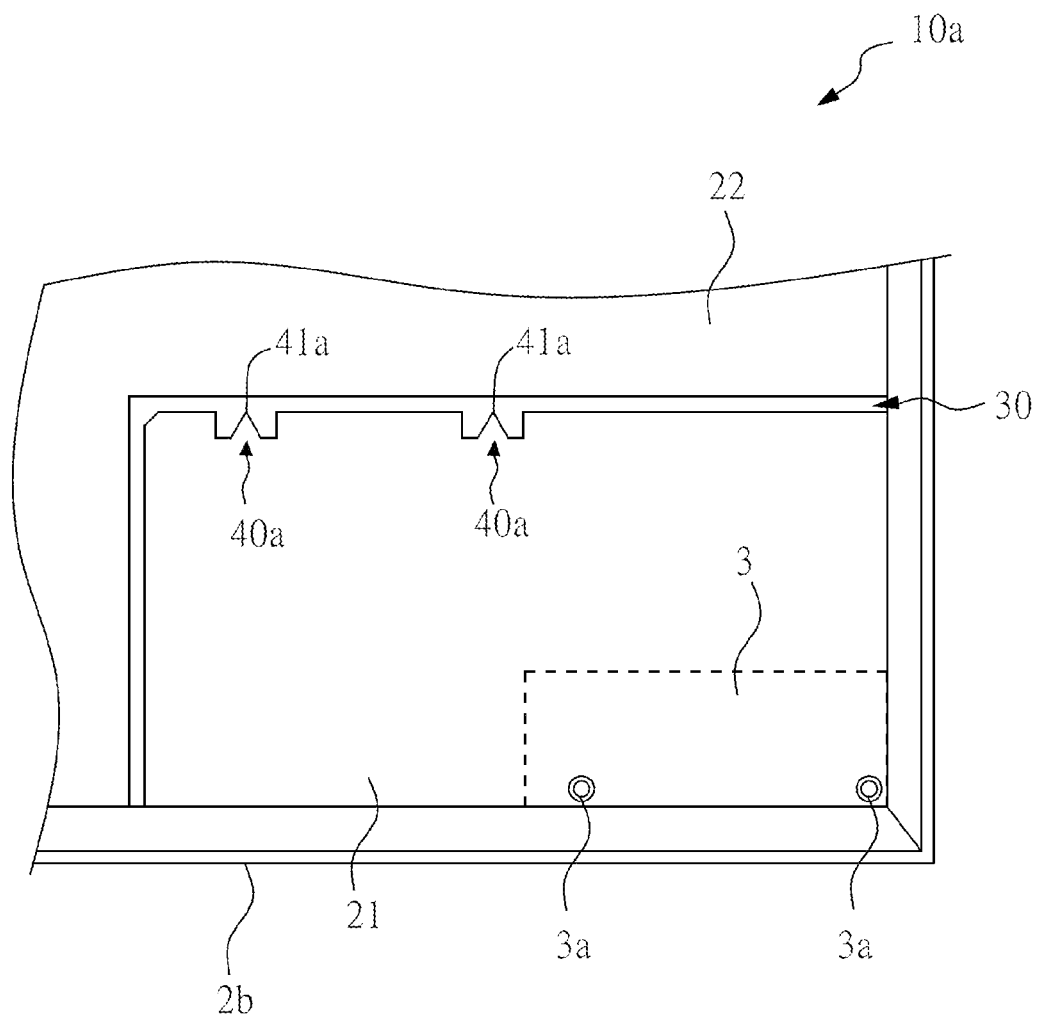
FIG. 2 is a schematic diagram of an outside of a first embodiment of an electrostatic discharge guide according to the present invention.

Next, referring to FIG. 2, FIG. 2 is a schematic diagram of an outside of a first embodiment of an electrostatic discharge guide according to the present invention.

In the first embodiment of the disclosure, the electronic device 1 may further include an antenna arrangement region 3 and an electrostatic discharge guide 10a. The electrostatic discharge guide 10a includes a first conductive region 21, a second conductive region 22, a non-conductive region 31, and a discharging unit 40a. The first conductive region 21 is disposed on an inner surface of the lower housing 2b, and the antenna arrangement region 3 is disposed in the first conductive region 21. For example, in FIG. 1, an antenna module (not shown in the figure) may be connected to a connection port 3a in the antenna arrangement region 3. The disclosure does not limit an arrangement of the antenna module, but the antenna arrangement region 3 does not exceed a range of the first conductive region 21. The second conductive region 22 is also disposed on the inner surface of the lower housing 2b. The non-conductive region 31 exists between the first conductive region 21 and the second conductive region 22. In this way, the non-conductive region 31 can isolate the first conductive region 21 from the second conductive region 22, and the first conductive region 21 and the second conductive region 22 do not come into contact and conduct electricity. The first conductive region 21 and the second conductive region 22 may be flat metal layers disposed on the inner surface of the lower housing 2b by sputtering, and the non-conductive region 30 is a region on the lower housing 2b where metal layer is sputtered. Alternatively, the first conductive region 21 and the second conductive region 22 may be disposed on the lower housing 2b by attaching the metal materials. The disclosure is not limited thereto. Other modules that require high-speed and high-traffic transmission, such as a USB 3.1 transmission module may be disposed in the second conductive region 22, but the disclosure is not limited to such modules. Since the non-conductive region 31 isolates the first conductive region 21 from the second conductive region 22, circuit units on the first conductive region 21 and on the second conductive region 22 do not interfere with each other.

The discharging unit 40a is located in the first conductive region 21. The discharging unit 40a is a flat metal layer, has an appearance similar to a triangle, and has a tip 41a. The tip 41a extends toward the second conductive region 22 to cause a spacing between the tip 41a and the second conductive region 22 to be less than or equal to a width of the non-conductive region 30. A smaller distance from the tip 41a to the second conductive region 22 brings more effective discharging of static electricity. Nevertheless, the tip 41a is not in contact with the second conductive region 22. An angle of the tip 41a is between 15 degrees and 45 degrees. By means of the discharging unit 40a disposed near the antenna arrangement region 3, the static electricity of the first conductive region 21 can be effectively discharged to the second conductive region 22.

Figure 3A:
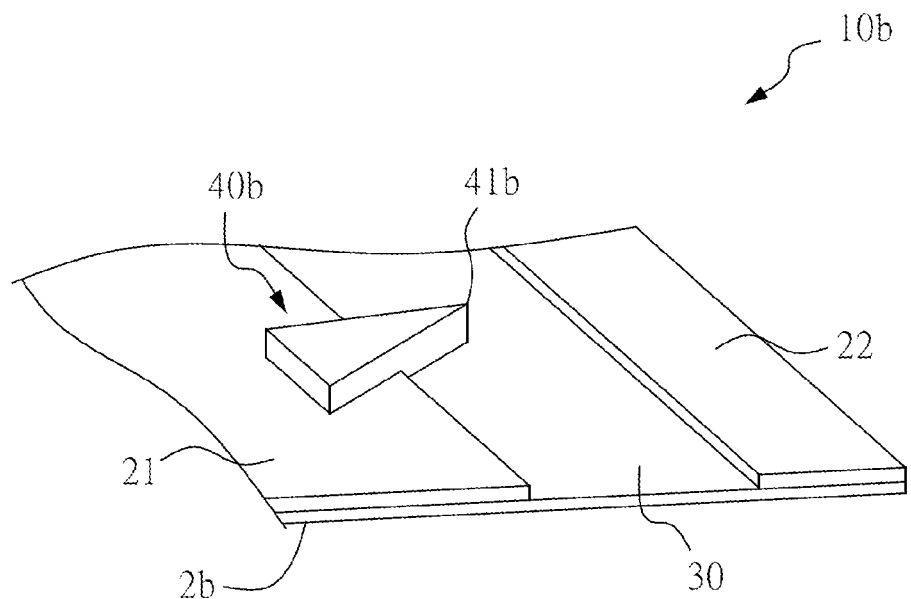
FIG. 3A is a three-dimensional schematic diagram of a second embodiment of the electrostatic discharge guide according to the present invention.
Figure 3B:
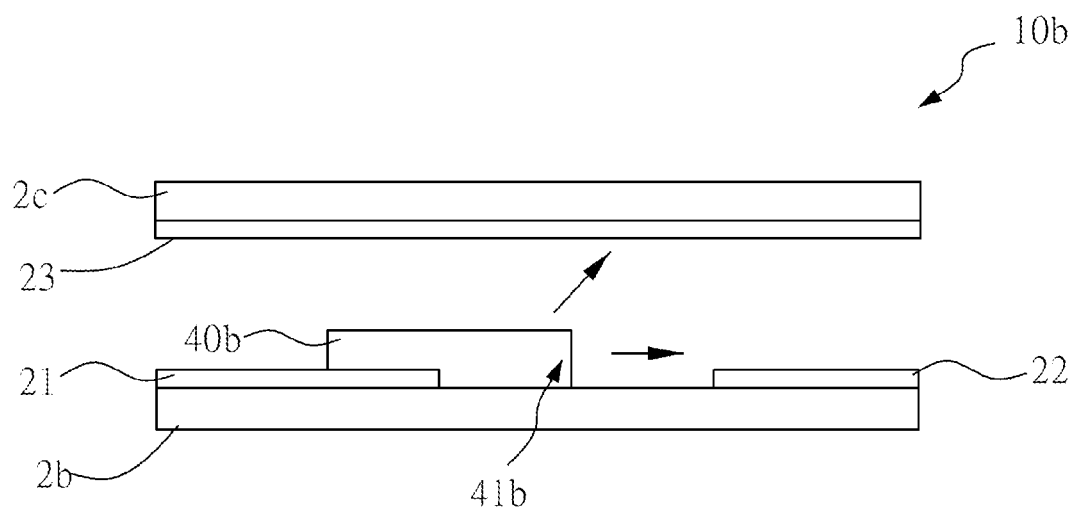
FIG. 3B is a schematic side view of the second embodiment of the electrostatic discharge guide according to the present invention.

Next, referring to FIG. 3A and FIG. 3B, FIG. 3A is a three-dimensional schematic diagram of a second embodiment of the electrostatic discharge guide according to the present invention, and FIG. 3B is a schematic side view of the second embodiment of the electrostatic discharge guide according to the disclosure.

In the second embodiment of the disclosure, a position of the first conductive region 21 on the inner surface of the lower housing 2b may protrude to form a three-dimensional structure. An appearance of the three-dimensional structure resembles a triangular prism. A discharging unit 40b and a tip 41b may cover the three-dimensional structure by sputtering or attaching metal sheets. A third conductive region 23 exists between the upper housing 2a and the lower housing 2b. The third conductive region 23 is disposed above the discharging unit 40b and is not in contact with the discharging unit 40b. A spacing between the tip 41b and the third conductive region 23 is less than a distance from the three-dimensional structure to the third conductive region 23. The third conductive region 23 may be disposed under the inner layer 2c by sputtering or attaching metal sheets. In this way, the discharging unit 40b can effectively discharge the static electricity to the second conductive region 22 through the tip 41b or discharge the static electricity to the third conductive region 23 by virtue of a height of the discharging unit 40b.

Figure 4:
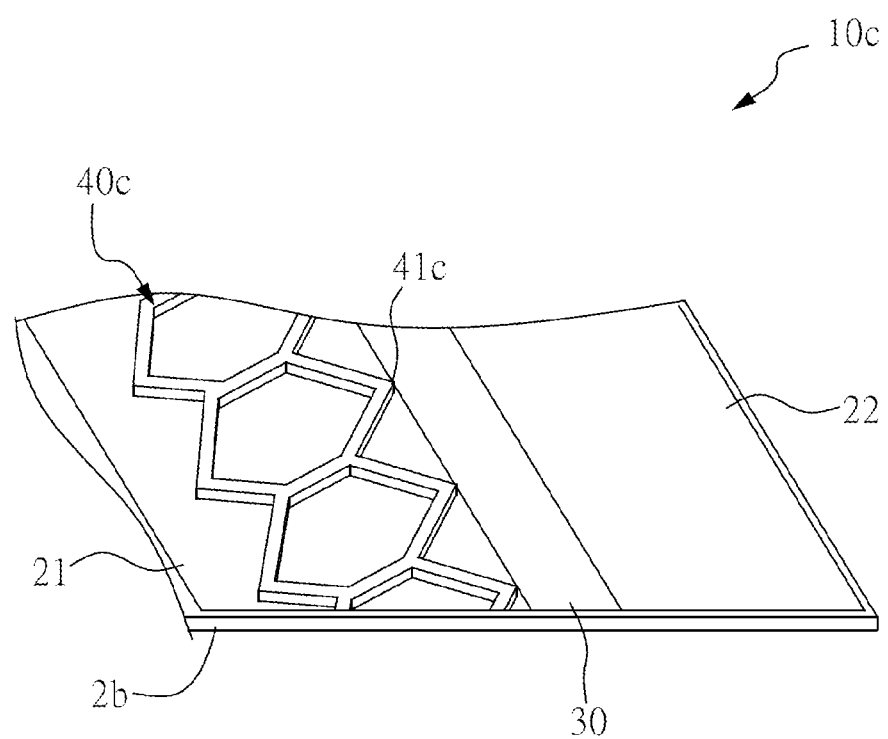
FIG. 4 is a three-dimensional schematic diagram of a third embodiment of the electrostatic discharge guide according to the present invention.

Finally, referring to FIG. 4, FIG. 4 is a three-dimensional schematic diagram of a third embodiment of the electrostatic discharge guide according to the present invention.

In the third embodiment of the present invention, the three-dimensional structure of the electrostatic discharge guide 10c is a continuous honeycomb-like protruding structure. Therefore, the discharging unit 40c has a honeycomb-like appearance and presents a plurality of tips 41c. The continuous three-dimensional structure can discharge static electricity to the second conductive region 22 and the third conductive region 23 by using the plurality of tips 41c, and can increase structural strength of the lower housing 2b, thereby resolving a problem that the lower housing 2b is excessively soft. However, the disclosure does not limit that the continuous three-dimensional structure can only be honeycomb-shaped. The continuous three-dimensional structure may alternatively be a continuously arranged triangular prism shape.

It can be learned from the above description that the electronic device 1 of the disclosure can effectively discharge the static electricity in the first conductive region 21 while avoiding signal interference, which is obviously superior than the design of the prior art.

It should be noted that this implementation merely examples exemplary embodiments of the disclosure. To avoid repetitive descriptions, all of possible modifications and combinations are not described in detail. However, those with ordinary knowledge in the art shall understand that the foregoing assemblies or components are not entirely necessary. Meanwhile, to carry out the present invention, other more detailed learning modules or components may also be included. The modules or components may be omitted or modified according to the requirements, and other modules or components may exist between any two modules. The foregoing is merely embodiments, but is not intended to be limited in the embodiments. Provided that the modules or components do not depart from the basic architecture of the present invention, they shall be included in the scope of rights claimed in the application, but they shall be subject to the scope of the patent.

What is claimed is:

1. An electronic device capable of discharging static electricity, comprising:
 a housing;
 an antenna arrangement region, disposed inside the housing; and
 an electrostatic discharge guide, comprising:
  a first conductive region, disposed on an inner surface of the housing, wherein the antenna arrangement region is disposed in the first conductive region;
  a second conductive region, disposed on the inner surface of the housing;
  a non-conductive region, spaced apart from the first conductive region and the second conductive region; and
  a discharging unit, located in the first conductive region and having a tip, wherein the tip extends toward the second conductive region to cause a spacing between the tip and the second conductive region to be less than or equal to a width of the non-conductive region, and the tip is not in contact with the second conductive region, thereby discharging static electricity of the first conductive region.

2. The electronic device capable of discharging static electricity according to claim 1, wherein the first conductive region and the second conductive region are metal layers sputtered on the housing, and the non-conductive region is a region on the housing where no metal layer is sputtered.

3. The electronic device capable of discharging static electricity according to claim 1, wherein the discharging unit is a flat metal layer.

4. The electronic device capable of discharging static electricity according to claim 1, wherein a three-dimensional structure is formed on the housing at a position of the first conductive region, and the tip of the discharging unit covers the three-dimensional structure.

5. The electronic device capable of discharging static electricity according to claim 4, wherein the housing further comprises a third conductive region, the third conductive region is disposed above the discharging unit and is not in contact with the discharging unit, and a spacing between the tip and the third conductive region is less than a distance from the three-dimensional structure to the third conductive region.

6. The electronic device capable of discharging static electricity according to claim 4, wherein the three-dimensional structure comprises a plurality of honeycomb-like protruding structures.

7. The electronic device capable of discharging static electricity according to claim 1, wherein an angle of the tip is between 15 degrees and 45 degrees.

* * * * *